United States Patent
Airaud et al.

(10) Patent No.: US 9,286,069 B2
(45) Date of Patent: Mar. 15, 2016

(54) DYNAMIC WRITE PORT RE-ARBITRATION

(71) Applicant: ARM LIMITED, Cambridge (GB)

(72) Inventors: Cédric Denis Robert Airaud, Sophia Antipolis Cedex (FR); Luca Scalabrino, Sophia Antipolis Cedex (FR); Frederic Jean Denis Arsanto, Sophia Antipolis Cedex (FR); Guillaume Schon, Sophia Antipolis Cedex (FR)

(73) Assignee: ARM Limited, Cambridge (GB)

( * ) Notice: Subject to any disclaimer, the term of this patent is extended or adjusted under 35 U.S.C. 154(b) by 636 days.

(21) Appl. No.: 13/723,974

(22) Filed: Dec. 21, 2012

(65) Prior Publication Data

US 2014/0181478 A1 Jun. 26, 2014

(51) Int. Cl.
*G06F 9/30* (2006.01)
*G06F 9/38* (2006.01)

(52) U.S. Cl.
CPC ........ *G06F 9/30145* (2013.01); *G06F 9/30014* (2013.01); *G06F 9/30141* (2013.01); *G06F 9/3857* (2013.01)

(58) Field of Classification Search
None
See application file for complete search history.

(56) References Cited

U.S. PATENT DOCUMENTS

| | | | |
|---|---|---|---|
| 5,651,124 A * | 7/1997 | Shen et al. | ..................... 712/215 |
| 6,487,653 B1 | 11/2002 | Oberman et al. | |
| 6,714,957 B1 | 3/2004 | Lohman | |
| 6,976,153 B1 | 12/2005 | Oliver et al. | |
| 8,335,911 B2 * | 12/2012 | Golla et al. | ..................... 712/220 |
| 2006/0112261 A1 * | 5/2006 | Yourst et al. | ..................... 712/218 |
| 2006/0179097 A1 | 8/2006 | Fleischer et al. | |
| 2007/0266071 A1 | 11/2007 | Dockser et al. | |
| 2009/0210678 A1 | 8/2009 | Ford | |
| 2009/0234984 A1 | 9/2009 | Chartanya et al. | |
| 2012/0110271 A1 | 5/2012 | Boersma et al. | |

OTHER PUBLICATIONS

Schwarz et al., "FPU Implementations with Denormalized Numbers", *IEEE Transactions on Computers*, vol. 54, No. 7, Jul. 2005, pp. 825-836.

* cited by examiner

*Primary Examiner* — Corey S Faherty
(74) *Attorney, Agent, or Firm* — Nixon & Vanderhye P.C.

(57) ABSTRACT

Within a processing pipeline 14, issue control circuitry 12 serves to arbitrate write port availability when floating point multiplication instructions are issued into a floating point pipeline 14. If not operating in a flush-to-zero mode, then depending upon the output operands generated denormal handling may or may not be required. A pessimistic assumption is made upon issue that denormal handling will be required and accordingly the write port reserved is a first predetermined number of processing cycles after the start cycle to take account of use of the denormal handling pipeline stage 20. Partway along the processing pipeline 14, state becomes available which indicates whether or not denormal handling is actually required. If denormal handling is not required and a write port is available one processing cycle earlier, then bypass circuitry 22 serves to bypass the denormal handling pipeline stage 20 such that the output operand will be written to the register bank 16 one processing cycle earlier. Write port usage is tracked by a write port usage scoreboard 26 which is both read and updated by the bypass circuitry 22 when re-arbitrating write port availability partway through a floating point multiplication instruction passing along the pipeline 14.

19 Claims, 3 Drawing Sheets

DYNAMIC WRITE PORT RE-ARBITRATION

BACKGROUND OF THE INVENTION

1. Field of the Invention

This invention relates to the field of data processing systems. More particularly, this invention relates to the control of the issue of program instructions into a processing pipeline in dependence of the availability of a write port to receive the results of the processing.

2. Description of the Prior Art

It is known to provide data processing systems with processing pipelines for performing processing operations under control of program instructions. In processing pipelines it is desirable to avoid, for example, stalls. Thus, before an instruction is issued into the pipeline, it is determined that a write port will be available at the appropriate clock cycle on any register bank which is to receive output operands from that instruction. Accordingly, when the output operands are generated by the processing pipeline, there will be no delay as a write port will be available in that processing cycle via which the output operands may be written to the register bank. This is predictive write port arbitration.

SUMMARY OF THE INVENTION

Viewed from one aspect the present invention provides apparatus for processing data comprising:

a register bank configured to store input operands and output operands of data processing operations performed under control of program instructions, said register bank having one or more write ports;

processing pipeline circuitry having a plurality of pipeline stages, said processing pipeline circuitry coupled to said register bank via at least said one or more write ports and configured to perform a data processing operation under control of a program instruction and a processing clock signal over a plurality of clock cycles of said processing clock signal to generate one or more output operands; and issue control circuitry configured to issue of said program instruction during a starting clock cycle into said processing pipeline circuitry to commence said data processing operation; wherein said issue control circuitry is configured to select said starting clock cycle such that, at a first predetermined number of clock cycles following said starting clock cycle, at least a minimum number of said one or more write ports will be available to permit said one or more output operands to be written to said register bank; and said processing pipeline circuitry includes bypass circuitry configured:

to detect, after said program instruction has been issued into said processing pipeline circuitry, a predetermined state generated by partial completion of said processing operation and indicative of permitted early generation of said one or more output operands; and if (i) said predetermined state is detected, and (ii) said one or more previously issued program instructions indicate that at least said minimum number of said one or more write ports will be available to permit said one or more output operands to be written to said register bank at a second predetermined number of clock cycles following said starting clock cycle, said second predetermined number being fewer than said first predetermined number, then to bypass one or more of said pipeline stages such that said one or more output operands are written to said register bank during a clock cycle following said starting clock cycle by said second predetermined number.

The present invention recognises that the number of pipeline stages through which a particular data processing operation need pass can be varied depending upon predetermined state which is available partway through the processing of that data processing operation by the pipeline. Such information is not available when the processing operation is first sent to the processing pipeline, but becomes available partway through the progression of the processing operation through the pipeline. Such information which is available partway along the pipeline may indicate that one or more of the pipeline stages are not necessary and can be bypassed thereby advantageously shortening the processing pipeline for that processing operation and therefore reducing the latency and energy cost associated with that processing operation. However, a difficulty with bypassing processing stages is that write port availability is no longer guaranteed. Accordingly, the bypass circuitry is responsive to the detected state indicating that one or more processing stages is no longer required together with one or more previously issued program instructions to determine that a minimum number of write ports will be available at an earlier clock cycle in order to permit output operands from the processing operation to be written to the register bank if the bypass is performed and the output operands are generated earlier. This technique effectively provides dynamic re-arbitration of write ports as a processing operation is progressing along a processing pipeline in dependence upon both state determined in relation to that processing operation and state relating to previously issued program instructions concerning the use of the write ports by those previously issued program instructions.

While the processing operations in respect of which the present technique may be employed can vary, the technique has application when the program instructions are floating point program instructions associated with floating point processing operations and floating point output operands that have both a mantissa value and an exponent value. In this context the predetermined state which is detected and used to potentially shorten the processing pipeline may be one which indicates that the output floating point operands cannot correspond to denormal floating point numbers. If it is determined partway along the processing pipeline that a denormal output is not possible, then the pipeline stage(s) which are needed to handle such denormal operands can be bypassed if there will be the necessary write ports available at the corresponding earlier processing cycle to receive the output operands that have bypassed the denormal pipeline handling stage(s).

While it is possible that the no denormals predetermine state could be determined in a variety of different ways, in some example embodiments this can be efficiently determined from the exponent values of the floating point output operands matching predetermined conditions (e.g. greater than zero by some minimum margin). In the context of a floating point program instruction that is a floating point multiplication instruction, such a predetermined characteristic may be that the difference between exponent values of the two input floating point values is greater than a minimum threshold value thereby indicating that no denormals will be generated.

In some floating point pipelines the bypass circuitry may be controlled by a flush-to-zero flag. It is known to provide some floating point pipelines with a flush-to-zero feature whereby if the flush-to-zero flag is set, then any denormals generated will instead be represented by a zero value rather than a denormal floating point value. This simplifies the pipeline and means that the denormal handling pipeline stage(s) can be bypassed independently of the predetermined state which is generated partway along the processing pipeline.

Viewed from another aspect the present invention provides apparatus for processing data comprising:

register bank means for storing input operands and output operands of data processing operations performed under control of program instructions, said register bank means having one or more write ports;

processing pipeline means for performing processing operations and having a plurality of pipeline stages, said processing pipeline means coupled to said register bank means via at least said one or more write ports and configured to perform a data processing operation under control of a program instruction and a processing clock signal over a plurality of clock cycles of said processing clock signal to generate one or more output operands; and issue control means for issuing of said program instruction during a starting clock cycle into said processing pipeline means to commence said data processing operation; wherein said issue control means selects said starting clock cycle such that, at a first predetermined number of clock cycles following said starting clock cycle, at least a minimum number of said one or more write ports will be available to permit said one or more output operands to be written to said register bank means; and said processing pipeline means includes bypass means for:
detecting, after said program instruction has been issued into said processing pipeline means, a predetermined state generated by partial completion of said processing operation and indicative of permitted early generation of said one or more output operands; and if (i) said predetermined state is detected, and (ii) said one or more previously issued program instructions indicate that at least said minimum number of said one or more write ports will be available to permit said one or more output operands to be written to said register bank means at a second predetermined number of clock cycles following said starting clock cycle, said second predetermined number being fewer than said first predetermined number, for bypassing one or more of said pipeline stages such that said one or more output operands are written to said register bank means during a clock cycle following said starting clock cycle by said second predetermined number.

Viewed from a further aspect the present invention provides a method of processing data comprising the steps of:

storing in a register bank input operands and output operands of data processing operations performed under control of program instructions, said register bank having one or more write ports;

performing processing operations using processing pipeline circuitry having a plurality of pipeline stages, said processing pipeline circuitry coupled to said register bank via at least said one or more write ports and configured to perform a data processing operation under control of a program instruction and a processing clock signal over a plurality of clock cycles of said processing clock signal to generate one or more output operands; and issuing said program instruction during a starting clock cycle into said processing pipeline circuitry to commence said data processing operation; wherein said issuing step selects said starting clock cycle such that, at a first predetermined number of clock cycles following said starting clock cycle, at least a minimum number of said one or more write ports will be available to permit said one or more output operands to be written to said register bank means; and further comprising the steps of detecting, after said program instruction has been issued into said processing pipeline circuitry, a predetermined state generated by partial completion of said processing operation and indicative of permitted early generation of said one or more output operands; and if (i) said predetermined state is detected, and (ii) said one or more previously issued program instructions indicate that at least said minimum number of said one or more write ports will be available to permit said one or more output operands to be written to said register bank at a second predetermined number of clock cycles following said starting clock cycle, said second predetermined number being fewer than said first predetermined number, bypassing one or more of said pipeline stages such that said one or more output operands are written to said register bank during a clock cycle following said starting clock cycle by said second predetermined number.

The above, and other objects, features and advantages of this invention will be apparent from the following detailed description of illustrative embodiments which is to be read in connection with the accompanying drawings.

DESCRIPTION OF THE EMBODIMENTS

Figure 1:
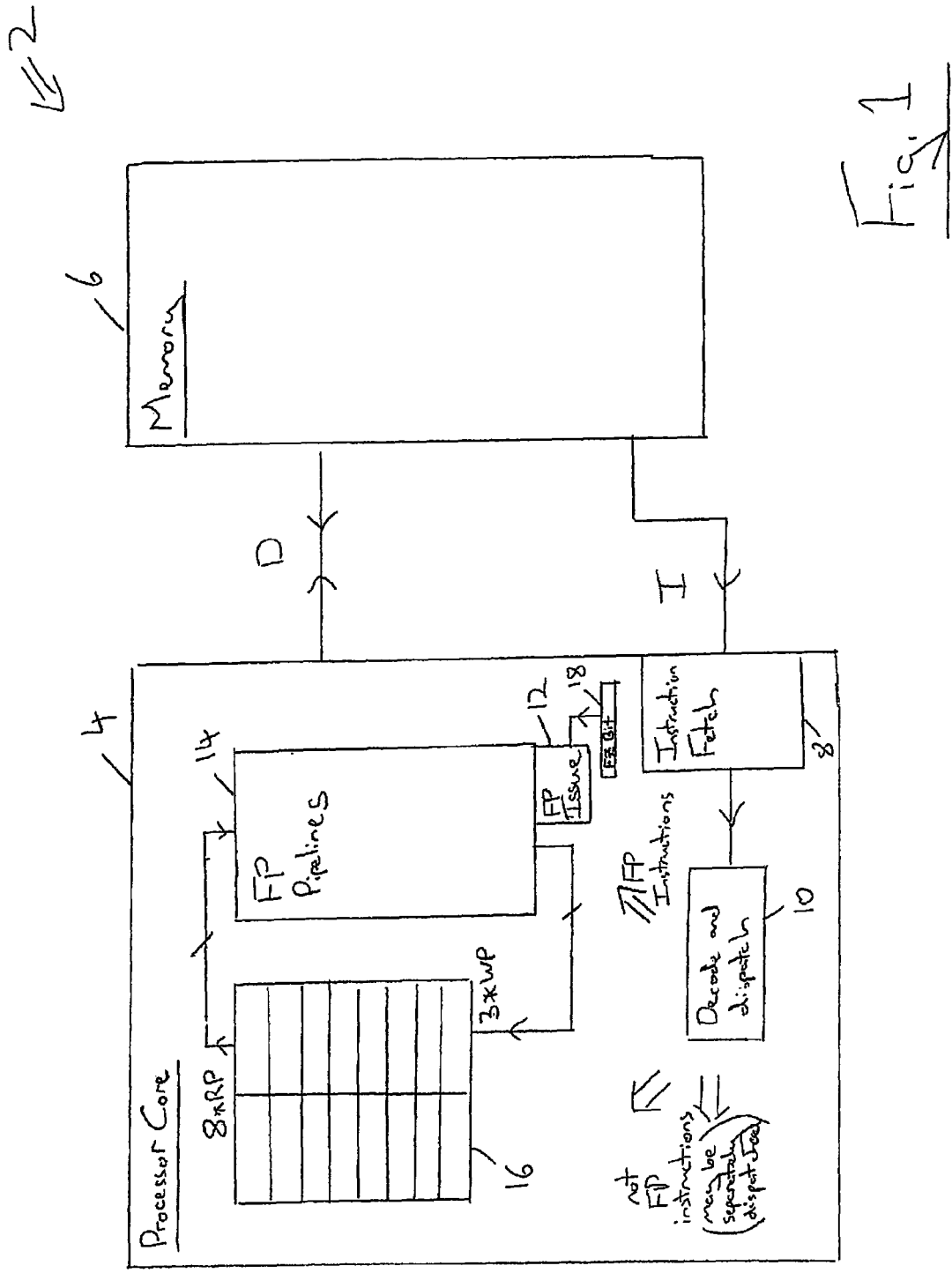
FIG. 1 schematically illustrates a data processing system including a processor core supporting multiple floating point pipelines.

FIG. 1 schematically illustrates a data processing system 2 including a processor core 4 coupled to a memory 6. The processor core 4 fetches instructions I from the memory 6 using an instruction fetch unit 8. These instructions can include both floating point instructions and other instructions. Decode and dispatch unit 10 is responsible for decoding and dispatching the floating point instructions. The non-floating point instructions may be decoded and dispatched by other processing units to further processing pipelines within the processor core 4. These further processing pipelines are not illustrated.

The floating point instructions dispatched are received in a floating point instruction queue 12 from which they are issued into floating point pipelines 14. The floating point pipelines 14 are coupled to a register bank 16 via eight read ports RP and three write ports WP. A flush-to-zero flag is stored within a flush-to-zero register 18 and supplied to the floating point issue queue 12 and the floating point pipelines 14 to control whether or not they operate in a flush-to-zero mode in which denormal outputs are set to zero rather than undergoing processing within denormal handling pipeline stages.

When a floating point instruction is ready for issue from the floating point issue queue 12 a determine is made as to whether or not a write port WP will be available to receive the output operands from that floating point instruction when it reaches the end of the floating point pipelines 14 (in this example the minimum necessary number of write ports is one). If denormal handling is a potential requirement, then a pessimistic assumption is made that the denormal handling pipeline stages will be used and accordingly the output operands will be generated a number of processing cycles later that includes the use of the denormal handling pipeline stages. If operating in flush-to-zero mode, then it is known that the denormal handling pipeline stages will be bypassed and accordingly a different number of processing cycles (fewer) will be assumed and used to check the availability or otherwise of a write port when the floating point instruction generates its output operands.

Once a floating point instruction has been issued into the floating point pipelines 14, a write port usage scoreboard is updated to indicate that the floating point instruction concerned will be using which of the write ports at given processing cycles in the future in accordance with normal scoreboarding techniques. The write port usage scoreboard thus keeps track of write port usage as instructions progress along the floating point pipelines. The floating point issue queue circuitry 12 reads the write port usage scoreboard to determine the availability or otherwise of the write port to receive output operands before a floating point instruction is issued as discussed above.

Figure 2:
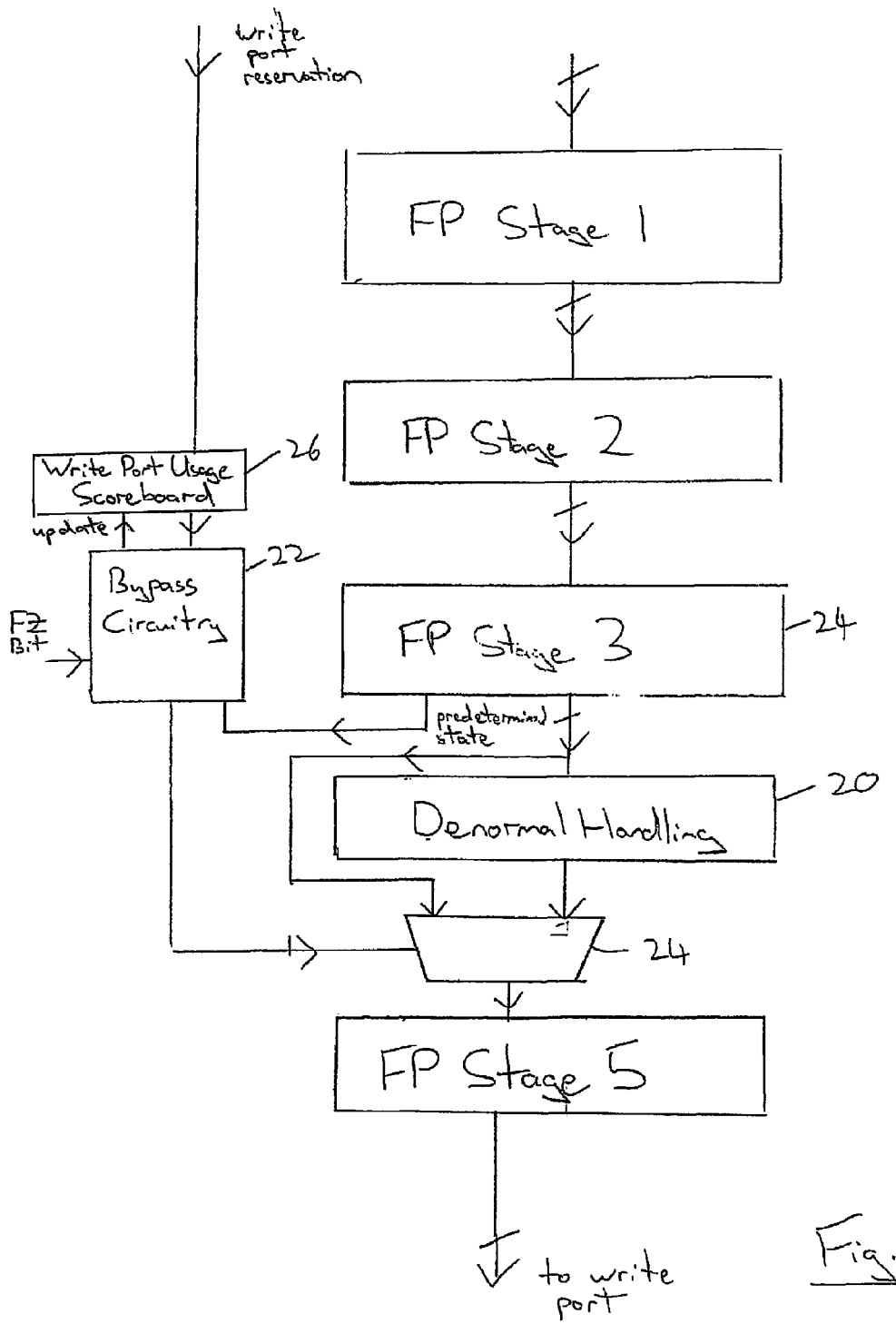
FIG. 2 schematically illustrates part of a floating point pipeline including bypass circuitry for selectively bypassing a denormal handling pipeline stage.

FIG. 2 schematically illustrates a portion of a floating point pipeline 14. In this example the floating point pipeline has a pipeline depth of up to five stages corresponding to five processing cycles. A denormal handling pipeline stage 20 may be bypassed under control of bypass circuitry 22 using a multiplexer 24. If the denormal handling pipeline stage 20 is bypassed, then the floating point pipeline will be effectively shortened in length for that floating point instruction from five processing cycles to four processing cycles. The floating point pipeline 14 will not be shortened in length in this way unless a write port is determined to be available to receive the output operands from the processing operation one processing cycle earlier than was originally envisaged when the floating point instruction was issued into the floating point pipeline 14.

The bypass circuitry 22 receives predetermined state from one of the processing stages 24 which precedes the denormal handling processing stage 20. This predetermined state indicates that the output operands cannot be denormal floating point numbers and accordingly processing by the denormal handling pipeline stage 20 is not necessary. In this circumstance, the bypass circuitry 22 reads the write port usage scoreboard 26 to determine whether or not a write port is available one processing cycle earlier than was previously reserved for use by the floating point instruction concerned. If a write port is available to receive the output operand one processing cycle earlier, as well as the predetermined state indicating that the normal handling is not required, then the bypass circuitry 22 controls the multiplexer 24 such that the denormal handling pipeline stage 20 is bypassed and the result from floating point stage 3 is supplied directly to floating point stage five. The bypass circuitry 22 when the denormal handling pipeline stage 20 has been bypassed serves to update the write port usage scoreboard 26 to indicate that one of the write ports will be used one processing cycle earlier as well as releasing the original reservation for the write port.

A flush-to-zero flag (FZBit) is received by the bypass circuitry 22 and is used to control the permanent bypassing of the denormal handling pipeline stage 20 if the flush-to-zero flag is set independently of the predetermined state.

The overall operation of the floating point pipeline 14 in FIG. 2 is that if the flush-to-zero flag is set, then the denormal handling pipeline stage 20 is bypassed irrespective of the predetermined state generated partway along the pipeline. If the flush-to-zero flag is not set, then the floating point instructions are issued into the floating point pipeline 14 using the pessimistic assumption that the denormal handling pipeline stage 20 will be required and a write port is reserved for the output operands five processing cycles later than the starting cycle at which the floating point instruction is launched into the floating point pipeline 14. If as the floating point instruction progresses along the floating point pipeline 14 it is determined that the denormal handling pipeline stage 20 will not be required, then the bypass circuitry 22 will bypass the denormal handling pipeline stage 20 if the write port reservation information held within the write port usage scoreboard 26 indicates that a write port will be available to receive the output operands from that floating point program instruction one processing cycle earlier than envisaged (e.g. four processing cycles after the starting cycle as compared to the original pessimistic assumption of five processing cycles after the start cycle).

Figure 3:
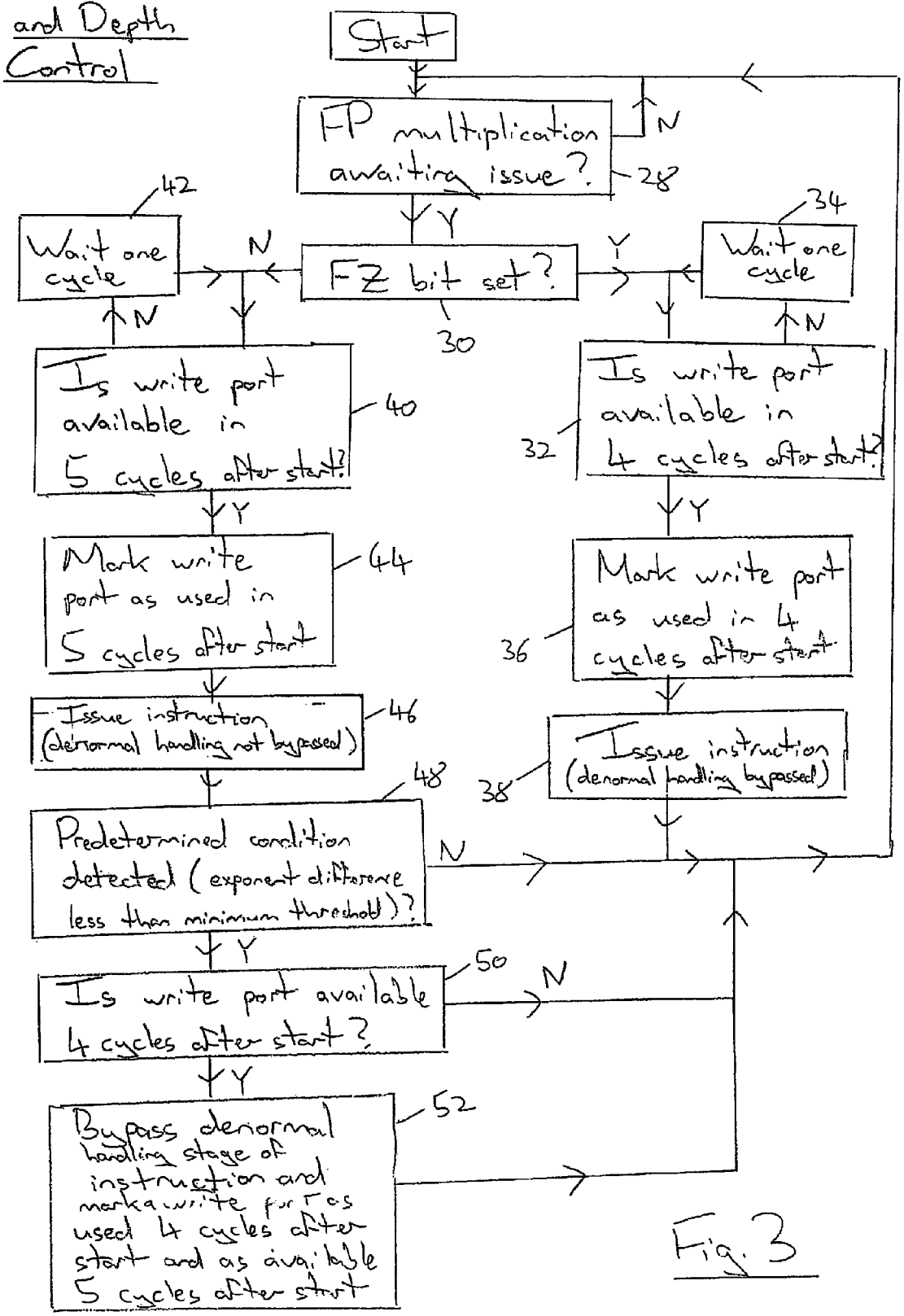
FIG. 3 is a flow diagram schematically illustrates pipeline issue and depth control.

FIG. 3 is a flow diagram schematically illustrating pipeline issue and depth control. Step 28 awaits a floating point multiplication instruction to issue. Step 30 determines whether or not the flush-to-zero flag is set. If the flush-to-zero flag is set, then processing proceeds to step 32 where it is determined whether or not a write port will be available four cycles after the current cycle. If a write port will not be available, then processing proceeds to step 34 where processing waits for one cycle until returning to step 32. If a write port is available four cycles after the start as determined at step 32, then step 36 serves to mark a write port as used by the floating point multiplication instruction concerned within the write port usage scoreboard 26. Step 38 then issues the floating point instruction into the floating point pipeline 14. As the flush-to-zero flag is set, the bypass circuitry 22 will use the multiplexer 24 to bypass the denormal handling pipeline stage 20 for all floating point multiplication instructions as denormal handling will never be required.

If the determination at step 30 is that the flush-to-zero flag is not set, then processing proceeds to step 40 where a determination is made as to whether or not a write port will be available five cycles after the start. This is the pessimistic assumption of the required pipeline depth that assumes that denormal handling will be required. If a write port is not available five cycles after the start, then processing proceeds to step 42 where it waits for one cycle before returning to step 40. When a write port is available five cycles after the start, then processing proceeds to step 44 where the write port usage scoreboard 26 is updated to mark a write port as used after five cycles from the start based upon the pessimistic assumption. Step 46 then issues the instruction into the instruction pipeline based upon the assumption that the denormal pipeline handling stage 20 will not be bypassed.

At step 48, which occurs when the program instruction has passed partway long the instruction pipeline 14, the bypass circuitry 22 serves to either detect or not detect a predetermined condition associated with the processing of that floating point multiplication instruction. This predetermined condition may be that the difference between two exponent values of the input operands to the multiplication (floating point numbers have both a mantissa value and an exponent value) is less than a minimum threshold value. This corresponds to a safe assumption that the result will not be a denormal number and accordingly the denormal handling pipeline stage 20 will not be required. If a predetermined condition is not detected, then the pipeline is not shortened and processing returns to step 28. However, if the predetermined condition is detected, then it is possible that the floating point pipeline could be shortened for that instruction if a write port is available one cycle earlier than was originally envisaged. Step 50 serves to determine whether or not a write port is available four cycles after the start of that floating point multiplication instruction using the data stored within the write port usage scoreboard 26. If a write port is not available one cycle earlier, then the pipeline will not be shortened and processing will proceed from step 50 back to step 28. However, if at step 50 it is determined that a write port is available one cycle earlier (i.e. the write port is re-arbitrated and determined to be available one cycle earlier), then processing proceeds to step 52 where the bypassed circuitry 22 serves to control the multiplexer 24 to bypass the denormal handling pipeline stage 20. The bypass circuitry 22 also serves to update the data held within the write port usage scoreboard 26 so as to mark a write port as used four cycles after the start by the newly re-arbitrated floating point multiplication instruction and to mark a write port as now available five cycles after the start as it will no longer be used by the re-arbitrated floating point multiplication instruction.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
 a register bank configured to store input operands and output operands of data processing operations performed under control of program instructions, said register bank having one or more write ports;
 processing pipeline circuitry having a plurality of pipeline stages, said processing pipeline circuitry coupled to said register bank via at least said one or more write ports and configured to perform a data processing operation under control of a program instruction and a processing clock signal over a plurality of clock cycles of said processing clock signal to generate one or more output operands; and
 issue control circuitry configured to issue of said program instruction during a starting clock cycle into said processing pipeline circuitry to commence said data processing operation; wherein
 said issue control circuitry is configured to select said starting clock cycle such that, at a first predetermined number of clock cycles following said starting clock cycle, at least a minimum number of said one or more write ports will be available to permit said one or more output operands to be written to said register bank; and
 said processing pipeline circuitry includes bypass circuitry configured:
 to detect, after said program instruction has been issued into said processing pipeline circuitry, a predetermined state generated by partial completion of said processing operation and indicative of permitted early generation of said one or more output operands; and
 if (i) said predetermined state is detected, and (ii) said one or more previously issued program instructions indicate that at least said minimum number of said one or more write ports will be available to permit said one or more output operands to be written to said register bank at a second predetermined number of clock cycles following said starting clock cycle, said second predetermined number being fewer than said first predetermined number, then to bypass one or more of said pipeline stages such that said one or more output operands are written to said register bank during a clock cycle following said starting clock cycle by said second predetermined number.

2. Apparatus as claimed in claim 1, wherein said program instruction is a floating point program instruction, said processing operation is a floating point processing operation and said one or more output operands are one or more floating point output operands each having a mantissa value and an exponent value.

3. Apparatus as claimed in claim 2, wherein said predetermined state is indicative that said one or more output floating point operands cannot correspond to denormal floating point numbers.

4. Apparatus as claimed in claim 3, wherein said one or more pipeline stages bypassed by said bypass circuitry are one or more denormal handling pipeline stages and are configured to generate, if required, one or more denormal floating point numbers as said one or more floating point output operands.

5. Apparatus as claimed in claim 3, wherein said predetermined state is that exponent values of all of said one or more floating point output operands match a predetermined characteristic.

6. Apparatus as claimed in claim 2, wherein said floating point program instruction is a floating point multiplication instruction of two input floating point operands and said predetermined characteristic is that a difference between exponent values of said two input floating point values is greater than a minimum threshold value.

7. Apparatus as claimed in claim 4, wherein said issue control circuitry and said bypass circuitry are controlled by a flush-to-zero flag such that if said flush-to-zero flag is disabled, then:
 (i) said issue control circuitry is configured to select said starting clock cycle in dependence upon one or more previously issued program instructions such that, at said first predetermined number of clock cycles following said starting clock cycle, at least said minimum number of said one or more write ports will be available to permit said one or more output operands to be written to said register bank; and
 (ii) said bypass circuitry is configured to detect, after said program instruction has been issued into said processing pipeline, that said one or more output operands are not denormal; and if (a) said if said one or more output operands are not denormal, and (b) said one or more previously issued program instructions indicate that at least said minimum number of said one or more write ports will be available to permit said one or more output operands to be written to said register bank at said second predetermined number of clock cycles following said starting clock cycle, then to bypass said one or more denormal handling stages such that said one or more output operands are written to said register bank during a clock cycle following said starting clock cycle by said second predetermined number.

8. Apparatus as claimed in claim 4, wherein said issue control circuitry and said bypass circuitry are controlled by a flush-to-zero flag such that if said flush-to-zero flag is enabled, then:
 (i) said issue control circuitry is configured to select said starting clock cycle in dependence upon one or more previously issued program instructions such that, at said second predetermined number of clock cycles following said starting clock cycle, at least said minimum number of said one or more write ports will be available to permit said one or more output operands to be written to said register bank; and (ii) said bypass circuitry is configured to bypass said one or more denormal handling pipeline stages independent of said predetermined state.

9. Apparatus as claimed in claim 1, wherein said one or more pipeline stages are part of a floating point multiplication pipeline.

10. Apparatus for processing data comprising:

register bank means for storing input operands and output operands of data processing operations performed under control of program instructions, said register bank means having one or more write ports;

processing pipeline means for performing processing operations and having a plurality of pipeline stages, said processing pipeline means coupled to said register bank means via at least said one or more write ports and configured to perform a data processing operation under control of a program instruction and a processing clock signal over a plurality of clock cycles of said processing clock signal to generate one or more output operands; and issue control means for issuing of said program instruction during a starting clock cycle into said processing pipeline means to commence said data processing operation; wherein said issue control means selects said starting clock cycle such that, at a first predetermined number of clock cycles following said starting clock cycle, at least a minimum number of said one or more write ports will be available to permit said one or more output operands to be written to said register bank means; and said processing pipeline means includes bypass means for:

detecting, after said program instruction has been issued into said processing pipeline means, a predetermined state generated by partial completion of said processing operation and indicative of permitted early generation of said one or more output operands; and if (i) said predetermined state is detected, and (ii) said one or more previously issued program instructions indicate that at least said minimum number of said one or more write ports will be available to permit said one or more output operands to be written to said register bank means at a second predetermined number of clock cycles following said starting clock cycle, said second predetermined number being fewer than said first predetermined number, for bypassing one or more of said pipeline stages such that said one or more output operands are written to said register bank means during a clock cycle following said starting clock cycle by said second predetermined number.

11. A method of processing data comprising the steps of:

storing in a register bank input operands and output operands of data processing operations performed under control of program instructions, said register bank having one or more write ports;

performing processing operations using processing pipeline circuitry having a plurality of pipeline stages, said processing pipeline circuitry coupled to said register bank via at least said one or more write ports and configured to perform a data processing operation under control of a program instruction and a processing clock signal over a plurality of clock cycles of said processing clock signal to generate one or more output operands; and issuing said program instruction during a starting clock cycle into said processing pipeline circuitry to commence said data processing operation; wherein said issuing step selects said starting clock cycle such that, at a first predetermined number of clock cycles following said starting clock cycle, at least a minimum number of said one or more write ports will be available to permit said one or more output operands to be written to said register bank means; and further comprising the steps of detecting, after said program instruction has been issued into said processing pipeline circuitry, a predetermined state generated by partial completion of said processing operation and indicative of permitted early generation of said one or more output operands; and if (i) said predetermined state is detected, and (ii) said one or more previously issued program instructions indicate that at least said minimum number of said one or more write ports will be available to permit said one or more output operands to be written to said register bank at a second predetermined number of clock cycles following said starting clock cycle, said second predetermined number being fewer than said first predetermined number, bypassing one or more of said pipeline stages such that said one or more output operands are written to said register bank during a clock cycle following said starting clock cycle by said second predetermined number.

12. A method as claimed in claim 11, wherein said program instruction is a floating point program instruction, said processing operation is a floating point processing operation and said one or more output operands are one or more floating point output operands each having a mantissa value and an exponent value.

13. A method as claimed in claim 12, wherein said predetermined state is indicative that said one or more output floating point operands cannot correspond to denormal floating point numbers.

14. A method as claimed in claim 13, wherein said one or more pipeline stages bypassed are one or more denormal handling pipeline stages and are configured to generate, if required, one or more denormal floating point numbers as said one or more floating point output operands.

15. A method as claimed in claim 13, wherein said predetermined state is that exponent values of all of said one or more floating point output operands match a predetermined characteristic.

16. A method as claimed in claim 12, wherein said floating point program instruction is a floating point multiplication instruction of two input floating point operands and said predetermined characteristic is that a difference between exponent values of said two input floating point values is greater than a minimum threshold value.

17. A method as claimed in claim 14, wherein if a flush-to-zero flag is disabled, then:

(i) selecting said starting clock cycle in dependence upon one or more previously issued program instructions such that, at said first predetermined number of clock cycles following said starting clock cycle, at least said minimum number of said one or more write ports will be available to permit said one or more output operands to be written to said register bank; and (ii) detecting, after said program instruction has been issued into said processing pipeline, that said one or more output operands are not denormal; and if (a) said if said one or more output operands are not denormal, and (b) said one or more previously issued program instructions indicate that at least said minimum number of said one or more write ports will be available to permit said one or more output operands to be written to said register bank at said second predetermined number of clock cycles following said starting clock cycle, then bypassing said one or more denormal handling stages such that said one or more output operands are written to said register bank during a clock cycle following said starting clock cycle by said second predetermined number.

18. A method as claimed in claim 14, wherein if a flush-to-zero flag is enabled, then:
  (i) selecting said starting clock cycle in dependence upon one or more previously issued program instructions such that, at said second predetermined number of clock cycles following said starting clock cycle, at least said minimum number of said one or more write ports will be available to permit said one or more output operands to be written to said register bank; and
  (ii) bypassing said one or more denormal handling pipeline stages independent of said predetermined state.

19. A method as claimed in claim 11, wherein said one or more pipeline stages are part of a floating point multiplication pipeline.

* * * * *